(12) United States Patent
White et al.

(10) Patent No.: US 12,499,327 B2
(45) Date of Patent: *Dec. 16, 2025

(54) SYSTEMS AND METHODS FOR INTENT-BASED NATURAL LANGUAGE PROCESSING

(71) Applicant: JPMORGAN CHASE BANK, N.A., New York, NY (US)

(72) Inventors: Ben White, Mount Gilead, OH (US); Michael C. Stikkel, Columbus, OH (US); James Cook, Westerville, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 280 days.

This patent is subject to a terminal disclaimer.

(21) Appl. No.: 18/296,304

(22) Filed: Apr. 5, 2023

(65) Prior Publication Data

US 2023/0244880 A1    Aug. 3, 2023

Related U.S. Application Data

(63) Continuation of application No. 17/241,890, filed on Apr. 27, 2021, now Pat. No. 11,663,421.

(51) Int. Cl.
| | | |
|---|---|---|
| *G06F 40/44* | (2020.01) | |
| *G06F 16/3329* | (2025.01) | |
| *G06F 40/279* | (2020.01) | |
| *G06F 40/35* | (2020.01) | |

(52) U.S. Cl.
CPC .......... *G06F 40/44* (2020.01); *G06F 16/3329* (2019.01); *G06F 40/279* (2020.01); *G06F 40/35* (2020.01)

(58) Field of Classification Search
CPC .... G06F 40/44; G06F 16/3329; G06F 40/295; G06F 40/35; G06F 40/279
See application file for complete search history.

(56) References Cited

U.S. PATENT DOCUMENTS

| | | | |
|---|---|---|---|
| 10,958,600 B1 * | 3/2021 | Annadata | ................ H04L 51/02 |
| 2021/0082400 A1 * | 3/2021 | Vishnoi | .................... G06F 40/30 |
| 2021/0157989 A1 * | 5/2021 | Orr | ........................ G06F 40/216 |
| 2021/0287667 A1 * | 9/2021 | Tan | ........................ G10L 15/063 |

* cited by examiner

*Primary Examiner* — Bhavesh M Mehta
*Assistant Examiner* — Jangwoen Lee
(74) *Attorney, Agent, or Firm* — GREENBERG TRAURIG LLP (57) ABSTRACT

A method for intent-based natural language processing may include a conversation engine receiving text of an utterance in a conversation from a conversation program, storing a session identifier for the conversation and a conversation state for the conversation, selecting one of a plurality a priority of intents based on the text of the utterance, communicating the text of the utterance to a natural language understanding computer program, receiving a plurality of potential intents and a confidence score for each potential intent from the natural language understanding computer program, selecting a selected intent based on the selected priority of intents, the potential intents, and the confidence scores, executing intent logic associated with the selected intent, updating the conversation state in the database based on the executed intent logic, and returning a response to the conversation program based on the executed intent logic.

17 Claims, 3 Drawing Sheets

SYSTEMS AND METHODS FOR INTENT-BASED NATURAL LANGUAGE PROCESSING

RELATED APPLICATIONS

This application is a Continuation of U.S. patent application Ser. No. 17/241,890, filed Apr. 27, 2021, now U.S. Pat. No. 11,663,421, the disclosure of which is hereby incorporated, by reference, in its entirety.

BACKGROUND OF THE INVENTION

1. Field of the Invention

Embodiments are generally directed to systems and methods for intent-based natural language processing.

2. Description of the Related Art

Internet-enabled devices, such as Amazon™ Alexa™ based devices and Apple™ Siri™, use natural language processing to have a bot-based "intelligent" conversation with a user. These devices convert audio of the user speaking a word or phrase into text, and then process the text to identify one or more action to take, to return requested content, etc. The use of such interfaces is expanding as the number of devices incorporating these devices increases.

SUMMARY OF THE INVENTION

Systems and methods for intent-based natural language processing are disclosed. In one embodiment, a method for intent-based natural language processing may include: (1) receiving, at a conversation engine, text of an utterance in a conversation from a conversation program executed on an electronic device; (2) storing, by the conversation engine, a session identifier for the conversation and a conversation state for the conversation in a database; (3) selecting, by the conversation engine, one of a plurality of priorities of intents based on the text of the utterance; (4) communicating, by the conversation engine, the text of the utterance to a natural language understanding computer program; (5) receiving, by the conversation engine, a plurality of potential intents and a confidence score for each potential intent from the natural language understanding computer program; (6) selecting, by the conversation engine, a selected intent based on the selected priority of intents, the potential intents, and the confidence scores; (7) executing, by the conversation engine, intent logic associated with the selected intent; (8) updating, by the conversation engine, the conversation state in the database based on the executed intent logic; and (9) returning, by the conversation engine, a response to the conversation program based on the executed intent logic.

In one embodiment, the electronic device may include an Internet of Things appliance.

In one embodiment, the conversation engine may further store a channel identifier with the session identifier, wherein the channel identifier may identify a channel over which the utterance was received.

In one embodiment, the session identifier may be received from a channel adapter for a channel over which the utterance was received.

In one embodiment, the conversation state may include a stack of processes.

In one embodiment, the stack of processes may include a base process and a sub-process.

In one embodiment, the priority of intents may be selected based on whether a question was asked by the conversation program.

In one embodiment, the intents in a first of the plurality of priority of intents may be ordered as a flow intent, a command intent, and an unexpected answer intent, and the intents in a second of the plurality of priority intents may be ordered as an expected answer intent, a command intent, a flow intent, and an unexpected answer intent.

In one embodiment, selected priority of intents and the potential intents may be programmatically weighted.

In another embodiment, an electronic device may include a computer processor and a memory comprising a conversation engine computer program. The conversation engine computer program may be configured to: (1) receive text of an utterance in a conversation from a conversation program executed by an electronic device; (2) store a session identifier for the conversation and a conversation state for the conversation in a database; (3) select one of a plurality of priorities of intents based on the text of the utterance; (4) communicate the text of the utterance to a natural language understanding computer program; (5) receive a plurality of potential intents and a confidence score for each potential intent from the natural language understanding computer program; (6) select a selected intent based on the selected priority of intents, the potential intents, and the confidence scores; (7) execute intent logic associated with the selected intent; (8) update the conversation state in the database based on the executed intent logic; and (9) return a response to the conversation program based on the executed intent logic.

In one embodiment, the electronic device may include an Internet of Things appliance.

In one embodiment, the conversation engine may further store a channel identifier with the session identifier, wherein the channel identifier may identify a channel over which the utterance was received.

In one embodiment, the session identifier may be received from a channel adapter for a channel over which the utterance was received.

In one embodiment, the conversation state may include a stack of processes.

In one embodiment, the stack of processes may include a base process and a sub-process.

In one embodiment, the priority of intents may be selected based on whether a question was asked by the conversation program.

In one embodiment, the intents in a first of the plurality of priority of intents may be ordered as a flow intent, a command intent, and an unexpected answer intent, and the intents in a second of the plurality of priority intents may be ordered as an expected answer intent, a command intent, a flow intent, and an unexpected answer intent.

In one embodiment, the selected priority of intents and the potential intents may be programmatically weighted.

According to another embodiment, a system for intent-based natural language processing may include: a first electronic device executing a conversation engine computer program; a second electronic device executing a natural language understanding computer program, wherein the conversation engine computer program may be in communication with the natural language understanding computer program; and a third electronic device executing a conversation program, the conversation program and the conversation engine computer program communicating over a communication channel. The conversation program may receive an utterance from a user and may communicate text of the utterance to the conversation engine computer program. The conversation engine computer program may store a session identifier for the conversation and a conversation state for the conversation in a database, may select one of a plurality of priorities of intents based on the text of the utterance, and may communicate the text of the utterance to a natural language understanding computer program. The natural language understanding computer program may generate a plurality of potential intents and a confidence score for each potential intent. The conversation engine computer program may select a selected intent based on the selected priority of intents, the potential intents, and the confidence scores, may execute intent logic associated with the selected intent, may update the conversation state in the database based on the executed intent logic, and may return a response to the conversation program based on the executed intent logic.

In embodiments, the conversation program may run within the conversation engine. There may be multiple conversation programs running on a single conversation engine, and depending on the channel and request, the conversation engine may determine which conversation program to invoke. The conversation program uses the programmatic API, provided by the conversation engine, to control the conversation engine, such as requesting data from a service, responding to a user with a statement, etc.

In one embodiment, the intents in a first of the plurality of priority of intents may be ordered as a flow intent, a command intent, and an unexpected answer intent, and the intents in a second of the plurality of priority intents may be ordered as an expected answer intent, a command intent, a flow intent, and an unexpected answer intent.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments are directed to systems and methods for intent-based natural language processing.

Figure 1:
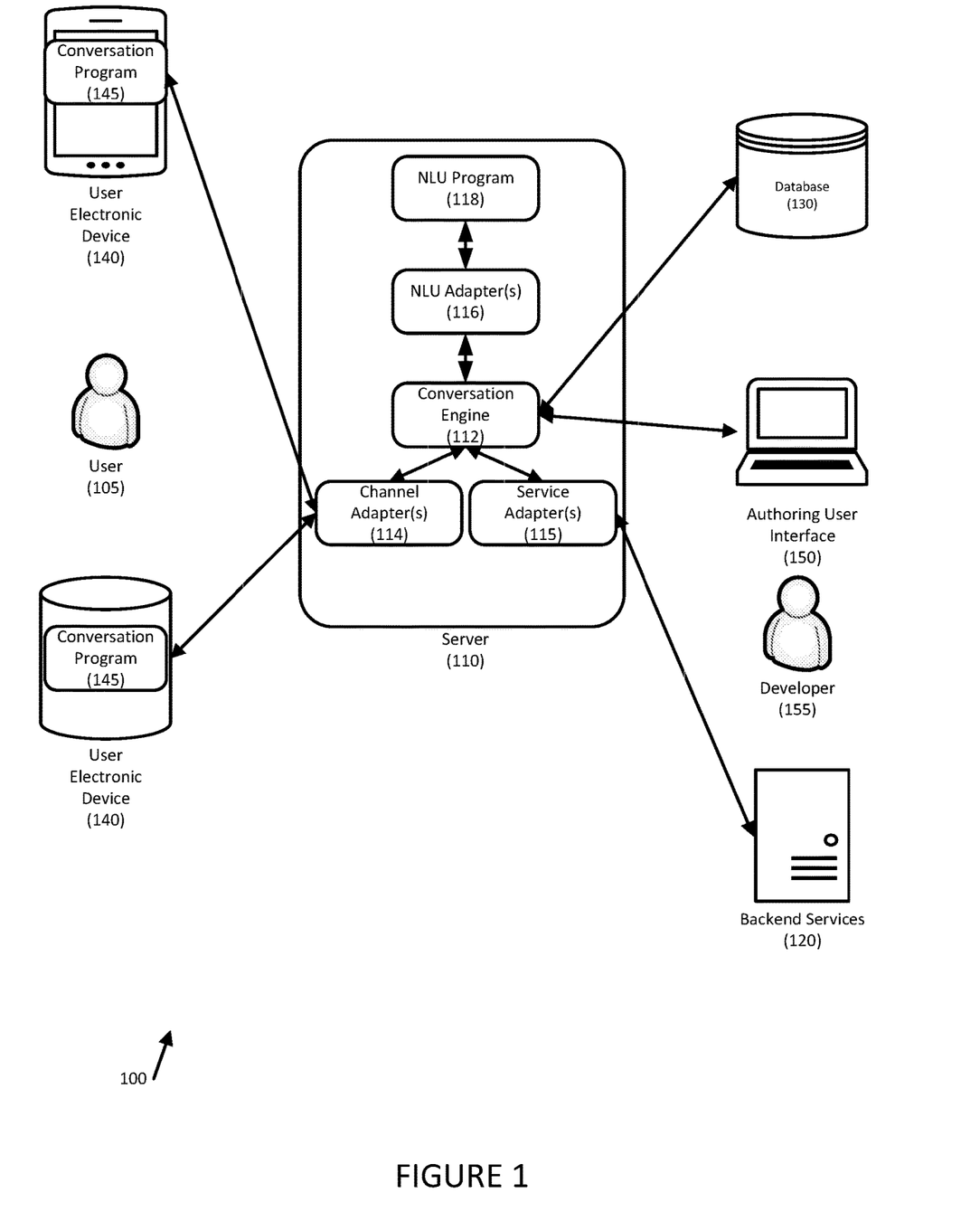
FIG. 1 is a depicts a system for intent-based natural language processing according to an embodiment.

Referring to FIG. 1, a system for intent-based natural language processing is disclosed according to an embodiment. System 100 may include one or more user electronic devices 140. In one embodiment, user electronic devices 140 may be any suitable device that may execute conversation program 145, such as Amazon™ Alexa™ Voice Services, Apple™ Siri™, Facebook™ Messenger platform, Microsoft's Microsoft™ Cortana™, etc. Examples may include computers, Internet of Things (IoT) devices, smart speakers, smart phones, tablet computers, etc. Conversation program 145 may receive a spoken utterance received from user 105 and may convert the spoken utterance into text, such as a string of words.

Each conversation program 145 may provide different information to conversation engine 112. Thus, a channel adapter 114 may be provided for each conversation program 145, such as one for Amazon™ Alexa™ Voice Services, one for Apple™ Siri™, etc. and may encapsulate the nuances of each conversation program 145, such as authentication, the customer's NL input, the response (e.g., how the conversation program responds to the user). For example, the response may support text-to-speech transformation, along with embedded audio files and visual artifacts for devices with screens (e.g., mobile/tablet, television, etc.), available widgets, etc.

Embodiments may support different types of NLU computer programs 118. Each NLU computer program 118 may have unique characteristics and integration APIs. Thus, conversation engine 112 may store training information (e.g., intents, entities, utterances, metadata, etc.), may map intents to each NLU computer program 118, may generate training data for each NLU computer program 118 based on the mapping created for that NLU computer program 118 in the format required for that NLU computer program 118, etc. In embodiments, conversation engine 112 may use a canonical NLU request/response API/structure. Embodiments may further provide adapter(s) 116, including an adapter for each NLU computer program 118 that convert the canonical request to NLU-specific requests, and the convert the responses back into the required canonical form. This may include entity formats, such as currency, dates, etc.).

Server 110 may be a server that hosts conversation engine 112 and natural language understanding (NLU) computer program 118. Server 110 may be a physical server, a cloud-based server, a combination thereof, etc. Conversation engine 112 and natural language understanding computer program 118 may be hosted on the same server 110, on different servers, etc.

These services are not required to run on a single server, and in practicality are typically hosted separately to facilitate unique auto-scaling of each service as load demands.

Conversation engine 112 may receive text of the spoken utterance from conversation program 145 and may provide the text to NLU computer program 118. Conversation engine 112 may further interface with database 130, which may maintain a state of a conversation between user 105 and conversation program 145. Conversation engine 112 may further communicate with backend services 120 in response to the received text. For example, backend services 120 may provide account balances, execute actions, etc.

One or more service adapter 115 may be provided to facilitate interaction with backend services 120.

Database 130 may store data related to the conversation. In one embodiment, database 130 may provide a plurality of layered conversation storage "buckets," such as one for the session, one for the device, and one for the user. The session bucket may store data that only needs to be saved for the life of the current conversation.

The device bucket may be associated to a specific user electronic device 140 for a specific user 105 so that user electronic devices 140 are individually configurable. For example, user 105 may authorize a first customer electronic device 140 to retrieve an account balance with a PIN, but a second customer electronic device 140 may not have the same level of access.

The user bucket may store data that should always be available for the given user. The user bucket may store data indefinitely for a given user 105 and may be accessed from any conversation that user 105 has with conversation engine 112. For example, embodiments may store usage statistics, and logic may modify the user experience based on the usage statistics. For example, user 105 may be provided with detailed instructions each time user 105 accesses a certain feature. After user 105 has used the feature a certain number of times, less verbose instructions may be provided.

In embodiments, authoring user interface 150 may be provided for developer(s) 155. Authoring user interface 150 provides an interface for developer(s) 155 to design, build, and test natural language applications, specify actions to be taken, etc.

In one embodiment, developer(s) 155 may include business logic into a range of lifecycle events. Example lifecycle events include logic that is triggered with every interaction with the user, when the conversation starts (e.g., once per conversation), when the conversation ends (e.g., once per conversation, but may not be triggered if the conversation is abandoned), when a top-level flow is initiated (e.g., get balance, pay card, etc.), when an interrupted flow is resumed, when a flow completes, etc. These events allow the conversation to act in predictable ways across the entire application and may inject business or other appropriate logic as is necessary and/or desired.

In one embodiment, lifecycle events may be used to customize the conversation to user 105. For example, when a conversation starts with user 105, certain features may be enabled/disabled. This provides the ability to have a measured feature rollout (e.g., idk/coming soon/beta feature), AB testing of features (e.g., measure feature flow A success/ feature flow B success), quick enable/disable of any feature (e.g., feature available/idk), customization of features (e.g., how to respond based on user specific options), etc. This provides the flexibility to manage the conversation features to be controlled externally, and without needing to deploy any code/config changes.

Figure 2A:
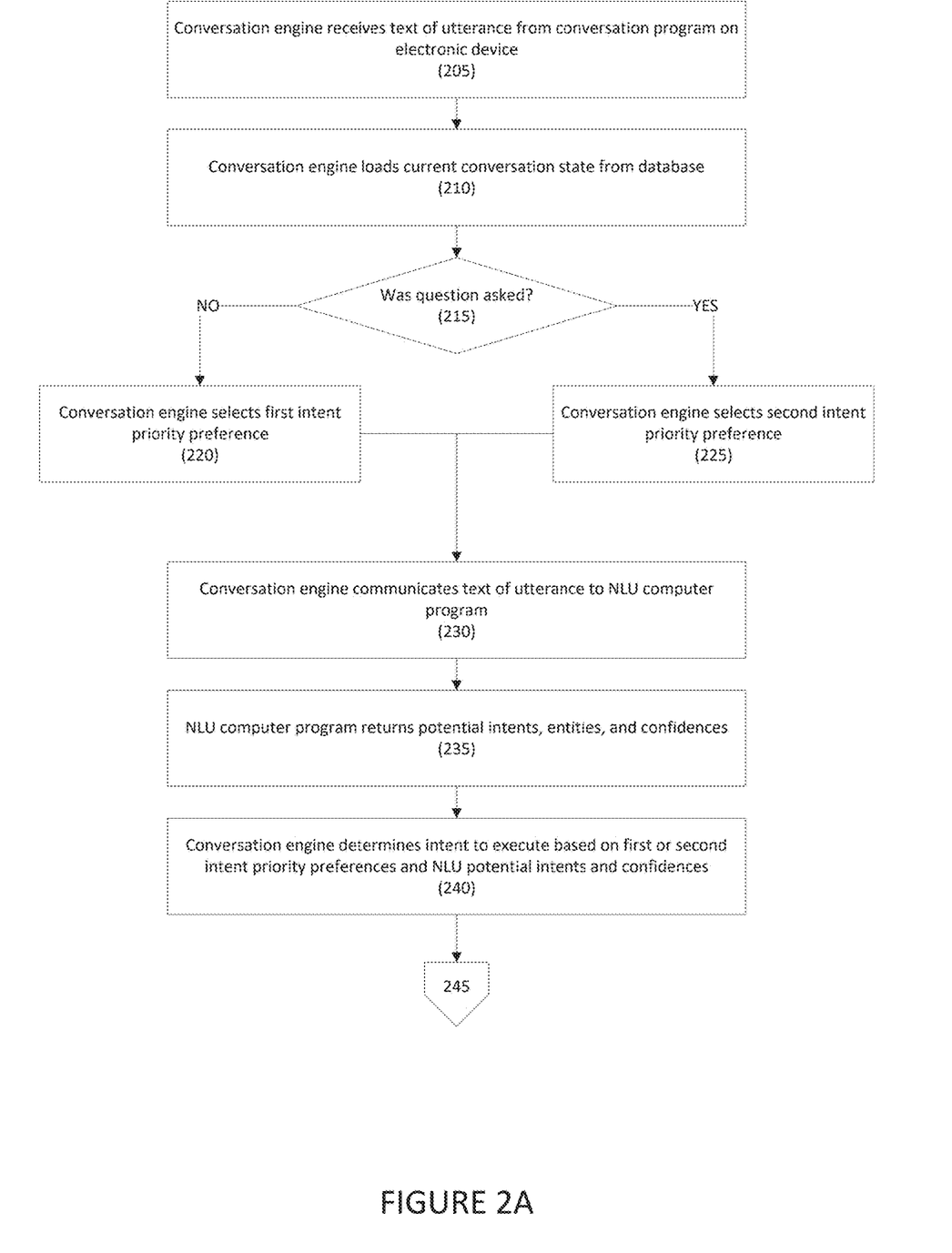
FIGS. 2A and 2B depict a method for intent-based natural language processing according to an embodiment.
Figure 2B:
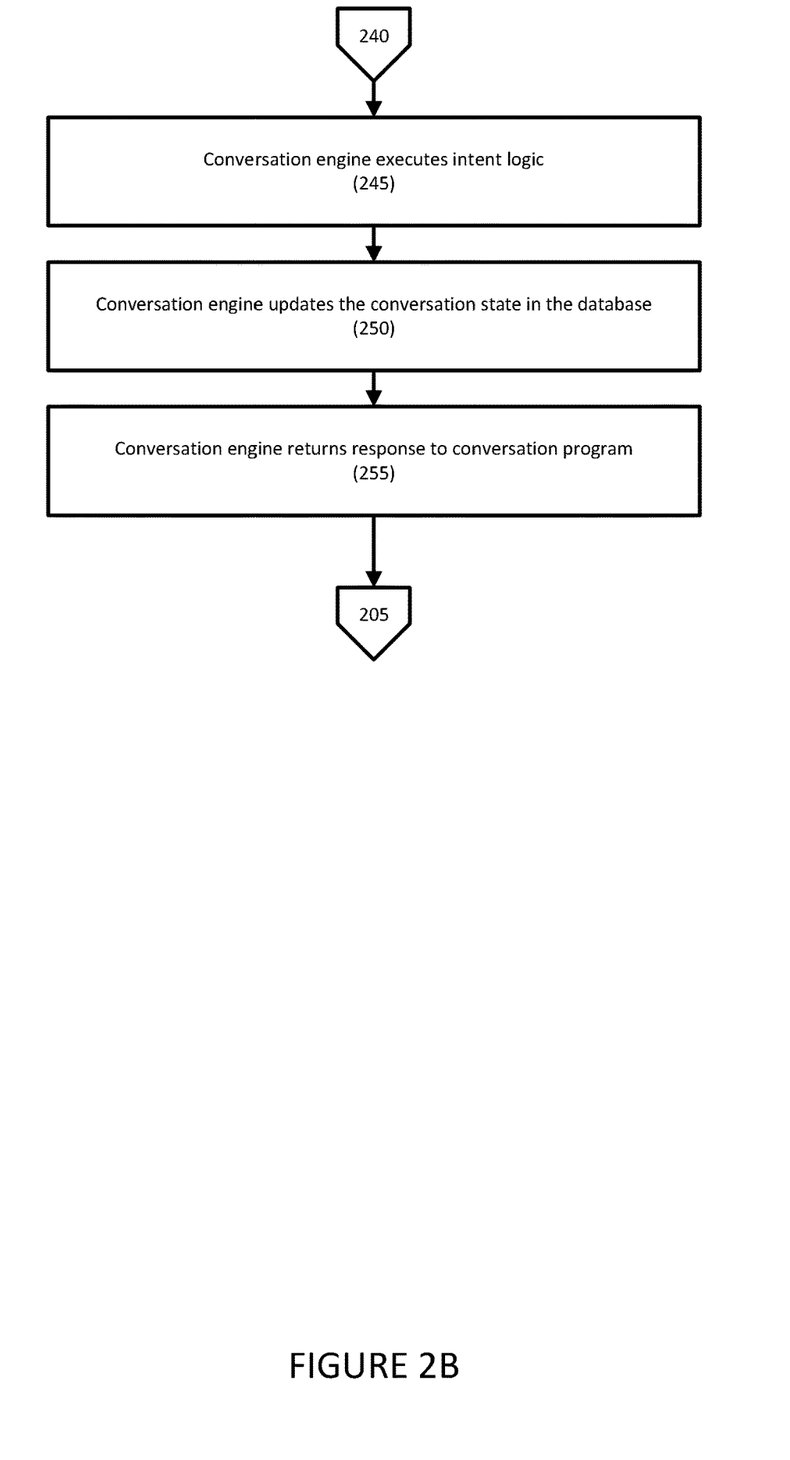

Referring to FIGS. 2A and 2B, a method for intent-based natural language processing is disclosed according to an embodiment. In step 205, a conversation engine executed by a server may receive text of an utterance from a user over a communication channel. In one embodiment, the text may be generated by a conversation program, such as Amazon™ Alexa™, Apple™ Siri™, etc.

The conversation engine may recognize the conversation program and the device that is the source of the utterance and may treat different conversation programs differently. For example, the conversation engine may identify whether the user is authenticated on a first device (e.g., a first Echo Dot) but not another (e.g., an Echo Show), whether the user is authenticated on with a first conversation program (e.g., Siri) but not another (e.g., Alexa), whether the user wishes to continue a conversation started on a first device on a second device, etc.

In one embodiment, the text of the utterance receives from the conversation program may include a session identifier, which may be any suitable unique identifier for the conversation. In one embodiment, the conversation program may provide the identifier. The conversation engine may append a channel identifier or similar to the session identifier, further enhancing its uniqueness.

In another embodiment, the channel adapter for the conversation program may assign or manage the session identifier to the conversation. Thus, the user may have multiple concurrent conversations, with each conversation having its own session identifier.

The session for a given conversation may have an expiration, such as a period of time, that may be extended with each user interaction. In one embodiment, after the session expires, the session may be deleted from the database. In another embodiment, the session may be stored in the database for a predetermined period of time, which may allow the conversation to be resumed at a later time.

The default duration of the session expiration may be determined by the channel adapter. Each channel may have different timeouts as is necessary and/or desired.

In addition, each conversation program may identify the user that provided the utterance and may map the user to a customer identifier or account. For example, the user may register as a customer with a conversation program, and the conversation program and/or the channel adapter may map the device and/or user to a customer identifier or account.

In one embodiment, the conversation programs may provide an identifier for the user and/or account with each utterance. The unique user/account id may be different for each channel. Each conversation program may manage the authentication of the users that it interacts with.

In step 210, using the session identifier, the conversation engine may load a current conversation state for the conversation with the user in a database. In one embodiment, if this is the first step in the conversation, the conversation engine may store an association between the session identifier and a conversation state. The initial state may indicate that the conversation has started; if the conversation has progressed, the conversation engine may update the conversation state based on the intent.

In one embodiment, if there is no database record associated to the current session being processed, an empty session structure may be created, and the conversation engine may understand that the session or conversation is new. Similarly, if no user database record is found, an empty user structure may be created.

In one embodiment, the conversation state may be a "stack" of processes. For example, a bottom layer of a stack may be a process, and sub-processes may be added and subtracted to the stack as information is requested or obtained from the customer.

An illustrative example of a stack is as follows:
User says: "pay credit card balance"
Conversation engine pulls session from database (empty)
    Stack=[ ]
Conversation engine selects and executes "paycard" as top-level flow
Stack=[Pay Card]
Paycard top-level flow determines it needs to select a card to pay
    Stack=[Pay Card, Select Account]
The "select account" sub-flow sees more than one card and asks user for card details
Conversation engine saves session state to database
Conversation engine response: "what card to make payment on?"
User says "sapphire card"
Conversation engine pulls session from database
    Stack=[Pay Card, Select Account]
The select account subflow identifies the requested account and completes
    Stack=[Pay Card]
Paycard top-level flow determines it needs to select an amount to pay
    Stack=[Pay Card, Select Amount]
The "select amount" subflow asks user for payment amount
Conversation engine saves session state to database
Conversation engine response: "how much to payment on card?"
User says "minimum payment"
Conversation engine pulls session from database
    Stack=[Pay Card, Select Amount]

The "select amount" subflow maps the description to an amount and completes
Stack=[Pay Card]
Paycard top-level flow makes the payment and tells user as much
Stack=[ ]
Conversation engine response: "your payment of $123.45 has been accepted"

It should be noted that this illustration of a stack is exemplary only, and different structures, organizations, etc. may be used as is necessary and/or desired.

In one embodiment, at any point in the conversation, a lifecycle event may occur. For example, a lifecycle event may occur when a conversation starts, when the conversation ends, when a top-level flow is initiated (e.g., get balance, pay card, etc.), when an interrupted flow is resumed, when a flow completes, etc. If a lifecycle event occurs, the process may perform the associated action, such as enabling/disabling features, etc.

In one embodiment, the conversation engine may respond to lifecycle events dynamically using, for example external controls APIs. For example, in the "start flow" lifecycle script, the developer may code "if the flow being started is x then replace that with y."

In step 215, the conversation engine may determine whether a question was asked. If a question was not asked, in step 220, the conversation engine may select a first priority of intents may be selected. An example of a first priority of intents may include a flow intent (e.g., get balance, pay card, lock card, etc.), a command intents (e.g., repeat, cancel, help, etc.), and unexpected answer/last resort intents (yes, no, answer amount, answer account type, etc.).

If a question was asked, in step 225, the conversation engine may select a second priority of intents may be selected. An example of a second priority of intents may include an expected answer (e.g., answer amount, answer amount description, etc.), a command intent (e.g., repeat, cancel, help, etc.), a flow intent (e.g., get balance, pay card, lock card, etc.), and unexpected answer/last resort intents (yes, no, answer amount, answer account type, etc.). The priority of intents may vary as is necessary and/or desired.

For example, at the beginning of a conversation, the intent priority may be flow intents, command intents, and unexpected answer/last resort intents. If, however, the user was asked "how much money would you like to transfer", the intent priority may be expected answer intents (e.g., currency, amount description), command intents, flow intents, and unexpected answer/last resort intents.

In step 230, the conversation engine may communicate the text of the utterance to the NLU computer program, and in step 235, the NLU computer program may return one or more potential intents, zero or more entities, and confidences in each intent and entity. Examples of potential intents may include command intents, expected answers, flow intents, etc. Examples of entities may be names, amounts, days, times, etc.

In step 240, the conversation engine may determine an intent to execute based on the first or second priority of intents, and the NLU potential intents and confidences. In one embodiment, the conversation engine priorities of intents and the NLU confidences may be programmatically weighed to determine the best course of action. In one embodiment, a trained machine learning model may be used to assign the weights to the conversation engine priorities of intents and the NLU confidences.

In step 245, the conversation engine may execute the intent.

In step 250, the conversation engine may update the conversation state in the database based on the executed intent logic. For example, the conversation engine may update the "stack" of processes saved in the database based on the result of the execution of the intent logic.

In step 255, the conversation engine may return a response to the conversation program, which may output the response to the user. The response may be based on the result of the executed intent logic, and may include a statement, an answer, an action, etc. If the user responds, the process will begin again at step 205.

Embodiments may support multiple concurrent conversation for a single user at the same time across both multiple customer electronic devices and multiple communication channels. Each conversation stream gets a unique experience based on the conversation they are having, even if another person is having a conversation on their account elsewhere. For example, the unique experience may be based on the channel identification and the session identifier.

In embodiments, service level interceptors may be provided. Service often require a myriad of systematic headers and data elements that are not integral to the feature logic. Examples of such services include trace id, authentication, etc. In one embodiment, the conversation engine may include service level interceptors that append any required bits to each service request, allowing the feature developer to focus on the bits that are related to the feature functionality. (e.g., account id, deposit amount, etc.). This may speed up and simplify service configuration.

Embodiments may provide integrated support for mocking service responses. This may accelerate feature development. It may further provide repeatable unit tests because mock services always return the expected response. Without mock services, backend services must always return the expect response, and they are difficult to maintain over time.

Embodiments may select a mock data set for each conversation. The mock data set can be defined for unit testing and can be layered (e.g., unique data set A, else default mock data). The mock data sets may have different responses based on the request data. The mock data may only be set at session start.

Embodiments may use subflows for common flows. There are many times when parts of one feature's conversation mimic parts of another feature. (e.g., selecting an account). Rather than copying this logic from one feature to another, embodiments may use subflows that allow the feature developer to implement the requirements of this common pattern one time and may use it throughout the application. The primary feature flow can simply pass some data to the subflow, and the subflow can perform the common task as needed.

An example of a sub-flow is as follows. For a transfer money flow, the user needs to identify the "from" account and the "to" account. The user may utter "I would like to transfer some money" and the conversation engine would identify a MoneyTransfer intent. MoneyTransfer needs a "from" account, so the MoneyTransfer intent calls the GetAccount sub-flow with the following data: accountType: DDA, maxAccounts: 1, accountBalance: >0.

GetAccount may look at the list of user accounts and may narrows the list based on the requested information (e.g., 2 DDA accounts). The conversation engine instructs the conversation program to ask "which account? checking 1234 or savings 9876." If the user responds with "checking," the conversation engine applies the "checking" filter to the accounts in scope and determines the account acceptance criteria has been reached. Thus, it returns the "checking 1234" account back to MoneyTransfer.

MoneyTransfer also needs a "to" account, so it calls the GetAccount sub-flow with the following data: accountType: DDA, maxAccounts: 1, accountId: not checking 1234. GetAccount looks at the list of user accounts and narrows the list based on the requested information. It then determines the account acceptance criteria has been reached, so it returns the "savings 9876" account back to MoneyTransfer. MoneyTransfer continues with rest of the feature flow.

In this example, the sub-flow GetAccount was used to acquire two different accounts for the same feature flow, and sometimes did not require any additional user interaction to perform its needed logic. This sub-flow may be called from any feature that requires account disambiguation, such as Reward Points, Investment Balance, Card Replacement, etc.

Embodiments may provide hierarchical Content Overrides. As illustrated by the example above, conversation flows may be nested within each other. The response content in a sub-flow may need to change to accommodate the context in which it's being used. For example, using the MoneyTransfer flow:

GetAccount Content (sub-flow)
  ContentKey:Disambiguate, Value:Which account? (default message)
MoneyTransfer Content (parent)
  Subflow: GetAccount, Property:FromAccount, ContentKey:Disambiguate, Value:Which account did you want to transfer the money from?
  Subflow:GetAccount, Property:ToAccount, ContentKey: Disambiguate, Value:Which account did you want to transfer the money into?

The conversation engine may look at the context in which a subflow is being executed and may use the most specific content available for its response. In the above example, MoneyTransfer holds content that applies to the GetAccount subflow, so whenever that subflow uses the Disambiguate content, in the context of MoneyTransfer, the content engine may use the MoneyTransfer content override to respond to the user. If MoneyTransfer did not contain any overrides, then the default GetAccount content would be used.

Although several embodiments have been disclosed, it should be recognized that these embodiments are not exclusive to each other, and certain elements or features from one embodiment may be used with another.

Hereinafter, general aspects of implementation of the systems and methods of the invention will be described.

The system of the invention or portions of the system of the invention may be in the form of a "processing machine," such as a general-purpose computer, a quantum computing device, a quantum computing device simulator, etc. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for intent-based natural language processing, comprising:
receiving, at a conversation engine, text of an utterance from a user in a conversation from a conversation program executed on an electronic device;
storing, by the conversation engine, a conversation state for the conversation in a database with a unique identifier for the conversation and a channel identifier for the electronic device, wherein the conversation state comprises a stack of processes that are added and subtracted as information is requested or obtained from the user;
determining, by the conversation engine, that the text of the utterance does not comprise a question;
selecting, by the conversation engine, one of a plurality of priority of intents selected from the group comprising a flow intent, a command intent, and an unexpected answer/last resorts intent in response to the determination;
communicating, by the conversation engine, the text of the utterance to a natural language understanding computer program;
receiving, by the conversation engine, a plurality of potential intents and a confidence score for each potential intent from the natural language understanding computer program;
selecting, by the conversation engine, a selected intent based on the selected priority of intents, the potential intents, and the confidence scores;
executing, by the conversation engine, intent logic associated with the selected intent;
updating, by the conversation engine, the conversation state in the database based on the executed intent logic; and
returning, by the conversation engine, a response to the conversation program based on the executed intent logic.

2. The method of claim 1, wherein the electronic device comprises an Internet of Things appliance.

3. The method of claim 1, wherein the stack of processes comprises a base process and a sub-process.

4. The method of claim 1, wherein the intents in a first of the plurality of priority of intents are ordered as a flow intent, a command intent, and an unexpected answer intent, and the intents in a second of the plurality of priority intents are ordered as an expected answer intent, a command intent, a flow intent, and an unexpected answer intent.

5. The method of claim 1, wherein the selected priority of intents and the potential intents are programmatically weighted.

6. A method for intent-based natural language processing, comprising:
receiving, at a conversation engine, text of an utterance from a user in a conversation from a conversation program executed on an electronic device;
storing, by the conversation engine, a conversation state for the conversation in a database with a unique identifier for the conversation and a channel identifier for the electronic device, wherein the conversation state comprises a stack of processes that are added and subtracted as information is requested or obtained from the user;
determining, by the conversation engine, that the text of the utterance comprises a question;
selecting, by the conversation engine, one of a plurality of priority of intents selected from the group comprising an expected answer intent, a command intent, a flow intent, and an unexpected answer/last resort intent;
communicating, by the conversation engine, the text of the utterance to a natural language understanding computer program;
receiving, by the conversation engine, a plurality of potential intents and a confidence score for each potential intent from the natural language understanding computer program;
selecting, by the conversation engine, a selected intent based on the selected priority of intents, the potential intents, and the confidence scores;
executing, by the conversation engine, intent logic associated with the selected intent;
updating, by the conversation engine, the conversation state in the database based on the executed intent logic; and
returning, by the conversation engine, a response to the conversation program based on the executed intent logic.

7. The method of claim 6, wherein the electronic device comprises an Internet of Things appliance.

8. The method of claim 6, wherein the stack of processes comprises a base process and a sub-process.

9. The method of claim 6, wherein the intents in a first of the plurality of priority of intents are ordered as a flow intent, a command intent, and an unexpected answer intent, and the intents in a second of the plurality of priority intents are ordered as an expected answer intent, a command intent, a flow intent, and an unexpected answer intent.

10. The method of claim 6, wherein the selected priority of intents and the potential intents are programmatically weighted.

11. A server electronic device, comprising:
a computer processor; and
a memory comprising a conversation engine computer program;
wherein the conversation engine computer program is configured to:
receive text of an utterance from a user in a conversation from a conversation program executed on an electronic device;
store a conversation state for the conversation in a database with a unique identifier for the conversation and a channel identifier for the electronic device, wherein the conversation state comprises a stack of processes comprising a base process and a sub-process that are added and subtracted as information is requested or obtained from the user;
determine that the text of the utterance does not comprises a question;
select one of a plurality of priority of intents selected from the group comprising an expected answer intent, a command intent, a flow intent, and an unexpected answer/last resort intent;
communicate the text of the utterance to a natural language understanding computer program;
receive a plurality of potential intents and a confidence score for each potential intent from the natural language understanding computer program;

select a selected intent based on the selected priority of intents, the potential intents, and the confidence scores;

execute intent logic associated with the selected intent;

update the conversation state in the database based on the executed intent logic; and return a response to the conversation program based on the executed intent logic.

12. The server electronic device of claim 11, wherein the electronic device comprises an Internet of Things appliance.

13. The server electronic device of claim 11, wherein the intents in a first of the plurality of priority of intents are ordered as a flow intent, a command intent, and an unexpected answer intent, and the intents in a second of the plurality of priority intents are ordered as an expected answer intent, a command intent, a flow intent, and an unexpected answer intent.

14. The server electronic device of claim 11, wherein the selected priority of intents and the potential intents are programmatically weighted.

15. The method of claim 1, further comprising:
continuing the conversation on a second electronic device using the unique identifier.

16. The method of claim 6, further comprising:
continuing the conversation on a second electronic device using the unique identifier.

17. The server electronic device of claim 11, wherein the wherein the conversation engine is further configured to continue the conversation on a second electronic device using the unique identifier.

* * * * *